United States Patent [19]

Lee et al.

[11] Patent Number: 4,900,579
[45] Date of Patent: Feb. 13, 1990

[54] PROCESS FOR APPLYING AND BONDING A SOLID LUBRICANT ON A SUBSTRATE

[75] Inventors: Kyu Y. Lee, Pusan, Rep. of Korea; Walajabad S. Sampath, Fort Collins; Samuel C. Wu, Lakewood, both of Colo.

[73] Assignee: Adolph Coors Company, Golden, Colo.

[21] Appl. No.: 158,169

[22] Filed: Feb. 18, 1988

[51] Int. Cl.$^4$ .......................... B05D 1/12; B05D 3/02
[52] U.S. Cl. ..................................... 427/11; 427/140; 427/189; 427/190; 427/191; 427/192
[58] Field of Search ................ 427/11, 140, 180, 189, 427/190, 191, 197, 192, 372.2, 376.1, 355, 369, 181; 428/304.4, 306.6, 307.7, 408, 689

[56] References Cited

U.S. PATENT DOCUMENTS

| | | | |
|---|---|---|---|
| 1,964,671 | 6/1934 | Nesbitt | 427/11 |
| 3,075,279 | 1/1963 | Haltner et al. | 427/11 |
| 3,573,962 | 4/1971 | Blampin | 427/11 |
| 3,632,368 | 1/1972 | Nelson | 427/190 |

FOREIGN PATENT DOCUMENTS

| | | | |
|---|---|---|---|
| 127672 | 10/1959 | U.S.S.R. | 427/11 |
| 558969 | 7/1977 | U.S.S.R. | 427/11 |

*Primary Examiner*—Sadie Childs
*Attorney, Agent, or Firm*—Klass & Law

[57] ABSTRACT

A process for applying and bonding a solid lubricant on a substrate whose surface has depressions and pores. The process comprises depositing fine solid lubricant particles on the surface of a substrate to be lubricated in excess of a quantity sufficient to fill essentially all depressions and pores on the substrate surface, and thereafter burnishing the substrate to distribute and bond the lubricant particles on the substrate. Such burnishing of the substrate can be accomplished during its moving contact with another substrate during intended use. Maintenance of lubricity can be accomplished by depositing additional lubricant particles on the substrate and thereafter burnishing, and can be performed while the substrate is in moving contact with another substrate whereby this moving contact performs the burnishing operation.

11 Claims, 2 Drawing Sheets

PROCESS FOR APPLYING AND BONDING A SOLID LUBRICANT ON A SUBSTRATE

BACKGROUND OF THE INVENTION

This invention relates to a process for applying and bonding a solid lubricant on a substrate to thereby impart lubricity to the substrate.

The lubrication of parts which are in moving contact with each other is necessary in order to maintain and protect the integrity of the respective parts and thereby permit continued efficient functioning of the apparatus in which the moving parts reside. A common lubricant which is effective in many applications is natural or synthetic oil. Vehicle engines, electric motors, and the like, typically employ oil to achieve required lubricity.

Oil, however, is not effective above certain temperatures since it will decompose and lose its lubricating qualities. As a result, solid lubricants have been developed for use in high temperature applications where more conventional lubricants are not adequate. Fluoride salt components such as barium fluoride and calcium fluoride, for example, are recognized as highly effective solid lubricants at high temperatures and moderately effective at room temperature. However, the application and bonding of such solid lubricants on a substrate such as a ceramic material which ultimately will be in moving contact with another substrate is presently rather complicated. In particular, such present application and bonding generally requires that the lubricant be applied to the substrate at very high temperatures so that the lubricant will be in a molten state or will be sintered during application. The lubricant essentially infiltrates the substrate, and the application may be performed under vacuum conditions. Despite these rather stringent and demanding techniques, the solid lubricants still suffer expected degradation when the substrate is placed in moving-contact use. Thus, when the lubricant is worn away, the substrate either must be discarded or the same complicated application procedure must be repeated to renew original lubricity. Solid lubricant films also have been deposited using sputtering technology, ion implantation, high-temperature force of a stick of solid lubricant against a substrate, water-slurry spray followed by firing in hydrogen, vacuum impregnation, plasma spray, and the like. As is apparent, all of these techniques likewise require specialized and generally complicated procedures.

It is therefore a primary object of the present invention to provide a process for applying and bonding a solid lubricant on a substrate at room temperature without requiring thermal activity whatsoever. Another object of the present invention is to provide a process for applying and bonding a solid lubricant on a substrate wherein fine solid lubricant particles are deposited on the substrate and a subsequent burnishing procedure distributes and bonds the lubricant particles on the substrate. Yet another object of the present invention is to provide a process wherein lubricity of a substrate can be effectively renewed after a portion of a previously-applied solid lubricant has worn away. These and other objects of the present invention will become apparent throughout the description thereof which now follows.

SUMMARY OF THE INVENTION

The present invention is a process for applying and bonding a solid lubricant on a substrate whose surface has depressions and pores. The process comprises depositing fine solid lubricant particles on the surface of a substrate to be lubricated in excess of a quantity sufficient to fill essentially all of the depressions and pores present on the surface of the substrate, and thereafter burnishing the substrate surface to thereby essentially-evenly distribute and bond the lubricant particles on the substrate. It is to be understood that the word "fine," as used throughout herein in describing the solid lubricant particles, is defined as a particle size which is up to about ⅔ the size of the depressions and pores present on the surface of the substrate. After deposition of the lubricant particles on the substrate, the substrate surface is burnished and the lubricant is effectively distributed and bonded on the substrate. Such burnishing of the substrate can be accomplished during its moving contact with another substrate during intended use. Maintenance of lubricity of the substrate, after a portion of the initial lubricant has expectedly worn away because of continued moving contact with another substrate, is accomplished by periodically depositing additional fine solid lubricant particles on the substrate and thereafter burnishing, and can be performed without stopping the moving-contact operation with the other substrate. In this manner, zero-wear to the substrate itself can be realized because rubbing action occurs only on the lubricant film. Therefore, longevity of substrate operation can be significantly enhanced.

DETAILED DESCRIPTION OF A PREFERRED EMBODIMENT

The present invention is a process for applying and bonding a solid lubricant on a substrate whose surface has depressions and pores. The process comprises depositing fine solid lubricant particles on the surface of the substrate in excess of a quantity sufficient to fill essentially all of the depressions and pores present on the surface thereof, and thereafter burnishing the substrate surface to essentially-evenly distribute and bond the lubricant particles on the substrate. Examples of solid lubricants include, but are not limited to, graphite, lithium fluoride, molybdenum sulfide, graphite fluoride, lead oxide, lead sulfide, lead, tin, gold, copper, zinc, silver, barium fluoride, calcium fluoride, and eutectic mixtures of barium fluoride and calcium fluoride. Substrates can be any material which is essentially solid and which has or is treated to have microscopic depressions and pores on its surface. In the preferred embodiment here described, a ceramic material constructed of metal oxide and primarily aluminum oxide (alumina) is the substrate, while a eutectic mixture of barium fluoride and calcium fluoride alone or admixed with silver, as well as calcium fluoride alone, are the preferred solid lubricants.

Figure 1:
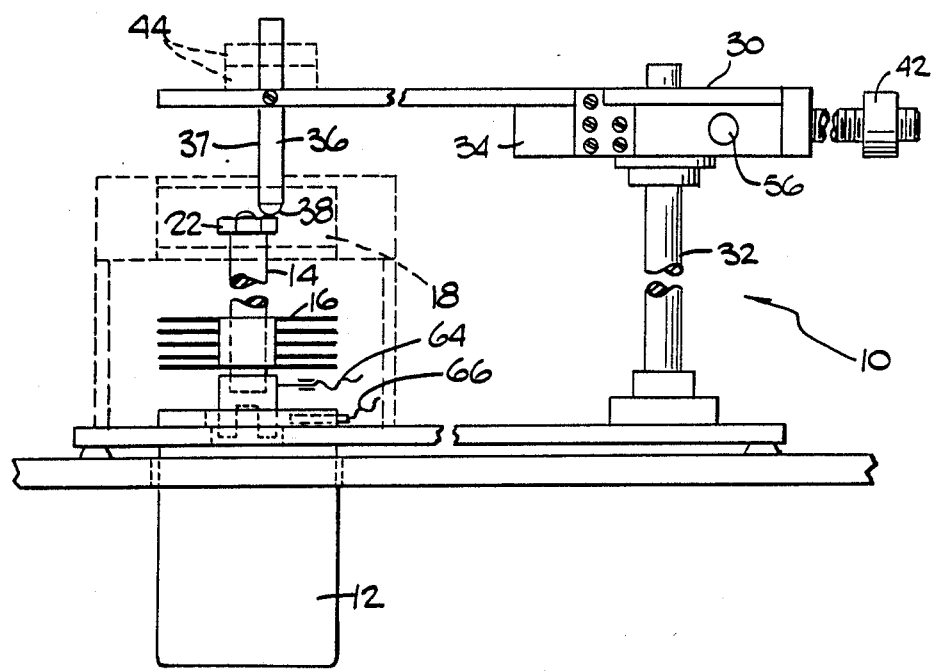
FIG. 1 is a schematic elevational view of an apparatus for testing lubricity of a substrate.
Figure 2:
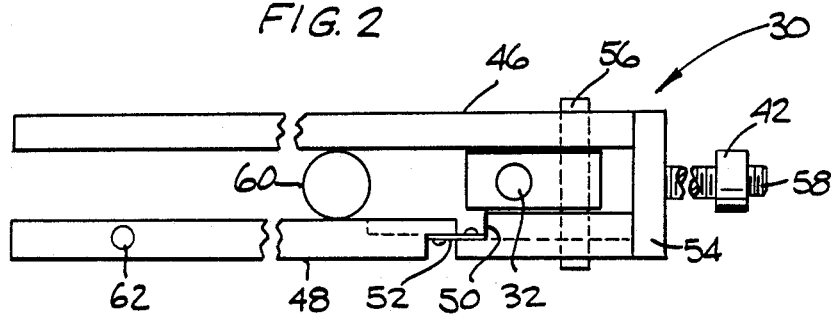
FIG. 2 is an enlarged schematic top plan view of the arm assembly of the apparatus of FIG. 1.
Figure 3:
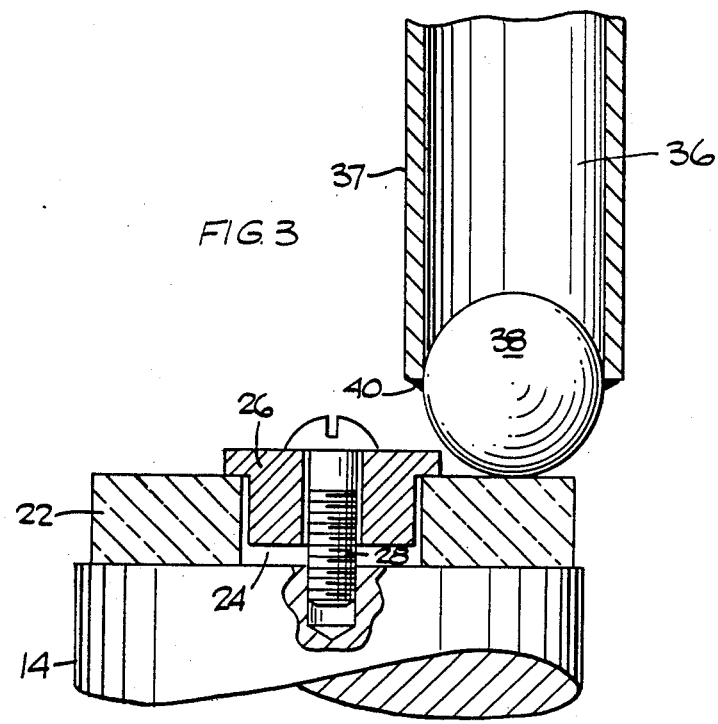
FIG. 3 is an enlarged schematic elevational view of the pin and sphere of the apparatus of FIG. 1.

An apparatus for testing lubricity of a lubricated substrate is schematically illustrated in FIGS. 1-3. The apparatus 10 comprises a D.C. electric motor 12 having a Monel super alloy rotating shaft 14 cooled by copper fins 16 and extending into a furnace 18. At the top of the shaft 14 can be placed a flat disk 22 constructed of substrate material having a center opening 24 in which a washer 26 and screw shaft 28 reside. The distal end of the screw shaft 28 is threadably engaged with the top of the shaft 14 to thereby secure the disk 22 to the top of the shaft 14. An adjustably-weightable, upwardly-pivotal force measuring arm assembly 30 extends over the disk 22 from a support post 32 and is held thereon by a spring bracket 34. Extending downwardly from the arm assembly 30 over the disk 22 is a tube 36 having a sphere 38 secured as with a compatible adhesive 40 within its lower end so that a portion of the sphere 38 is in contact with the disk 22 when the arm assembly 30 is properly weighted. The sphere 38 is also constructed of substrate material. The tube 3 and secured sphere 38 are collectively referred to as a "pin" 37. The arm assembly 30 is provided with a counter weight 42 beyond the support post 32, and additional weights 44 can be placed directly above the pin 37.

As shown in FIG. 2, a top plan view of the force measuring arm assembly 30, the assembly 30 comprises a conventional strain ring gauge 60 placed between a rigid arm 46 and a limitedly-movable arm 48. The arm 48 is connected to a bracket 50 through a flat spring plate 52. The arms 46 and 50 are connected through a rigid member 54. The entire arm assembly 30 is pivoted about a pin 56 through a set of bearings for free rotation. A screw 58 with an adjustable counter weight 42 allows the balancing of the whole arm assembly 30 about the pin 56 when the pin 56 is horizontal. During force measurement, the pin 56 of the assembly 30 is horizontal and is balanced by adjusting the weight 42. The pin 37 is placed in an opening 62 and clamped to the ar 48. Friction force generated by the sphere 38 rubbing against the rotating disk 38 causes deflection of the arm 48 and induces strain in the ring gauge 60. The strain detectors of the ring gauge 60 are connected to a conventional strain gauge amplifier (not shown) and the signal from the amplifier is monitored using a conventional oscilloscope and a chart recorder. In this manner, friction force can be measured. The motor 14 is provided with a standard revolution counter 64 and speed indicator 66, as well as with a conventional stepless speed controller means. The furnace 18 is electric and is provided with standard temperature control means. Throughout all of the examples which follow, the apparatus 10 was employed in the testing procedures.

EXAMPLE 1

A ceramic disk comprising 85% aluminum oxide was prepared by polishing with a microid diamond compound using a nylon cloth and a light oil. After polishing, the disk was ultrasonically cleaned with a soap solution for 30 minutes and then rinsed with distilled water for 30 minutes. Finally, the disk was cleaned with methyl alcohol for 30 minutes in an ultrasonic cleaner. About 20 grams of a eutectic mixture of 68% barium fluoride and 32% calcium fluoride was stirred into about 40 ml methyl alcohol, in which the eutectic mixture is insoluble, to thereby produce a colloidal suspension. After approximately 15 minutes, the time required to allow larger particles of the eutectic mixture to settle to the bottom of the vessel in which the suspension resides, the ceramic disk was placed in the colloidal suspension and a deposition of colloidal particles yet in suspension occurred on the disk as these particles gravitationally moved to the surface of the disk. Subsequent electron microscopy showed that the size of the particles deposited on the disk ranged up to about ⅜ the size of the depressions and pores present on the surface of the disk. The 15-minute time period provided prior to placing the disk in the suspension allowed larger particles to settle to the bottom of the vessel and thereby not deposit on the disk. After particle deposition, the disk remained in the vessel until the alcohol evaporated and the disk was dry. After such drying, a fine powder of the eutectic mixture remained on the disk.

The disk was then secured to the top of the shaft 14 of the motor 12 in the apparatus 10, as earlier described. A ceramic sphere 38, having the physical and mechanical properties as shown in Table 1, was secured using ceramic cement 40 within the lower end of the tube 36 so that the sphere was in contact with the disk. The tube 36 was also constructed of ceramic according to the same specifications as shown in Table 1.

TABLE 1

| Physical and Mechanical Properties of Ceramic Sphere | |
|---|---|
| PHYSICAL PROPERTIES | |
| Specific Gravity | 3.80–3.84 |
| Density | 0.139 lb./in$^3$ |
| MECHANICAL PROPERTIES | |
| Tensile Strength (77° F.) | 28 Kpsi |
| Tensile Strength (1832° F.) | 15 Kpsi |
| Compressive Strength (77° F.) | 330 Kpsi |
| Compressive Strength (1832° F.) | 140 Kpsi |
| Hardness (Vickers) | 1365 |
| Modulus of Elasticity | 52,000 KSI |
| Maximum Useful Temp | 3180° F. |
| Water Absorption | NIL |
| Magnetic Properties | Non-Magnetic |
| Thermal Conductivity | 35.6 W/m °C. (@ 20° C.) |
|  | 6.3 W/m °C. (@ 800° C.) |
| Thermal Expansion | 4.65 × 10$^{-6}$/°F. |
| Electrical Resistivity | >10$^{14}$ Ohm/cm (@ 25° C.) |
|  | 2.5 × 10$^6$ Ohm/cm (@ 900° C.) |
| Corrosion Resistance | Inert to most substances |

The furnace was heated to 700° C., a load of 250 gms. was applied to the sphere, and the disk was rotated unidirectionally at 304 RPM. Rubbing of the disk and sphere against each other resulted in a burnished track surface on the disk wherein the eutectic mixture was evenly distributed and bonded. After a continuous run of 9.5 hours, the test was terminated and wear on the sphere, which is representative of wear on the disk, was measured by optical microscopy of a mold release wax replica thereof. The mold release wax was produced by LECO Company, Product No. 811-272. The procedure for replicating the worn surface of the sphere involved the following steps. The worn surface of the sphere was briefly dipped into molten wax without removing the sphere from the wear testing machine. Super-heating of the molten wax was necessary to produce good replication, and it was necessary for wax solidification to begin at the interface of the molten wax and the ceramic sphere. This was accomplished by keeping the sphere cold during replication procedures. After solidification, the wax replicas were removed by gentle prying. Microscopic inspection of the sphere itself and the wax replica thereof confirmed that the wax replication was exact. The average wear factor, being the volume worn per unit sliding distance per unit normal load, of the sphere was $2.8 \times 10^{-16}$ m$^3$/(N−m)$^{-1}$.

EXAMPLE 2

In the same manner as in Example 1, a ceramic disk comprising 85% aluminum oxide was polished and cleaned. No solid lubricant was applied to the disk before it was secured to the top of the shaft 14 of the motor 12 in the apparatus 10, as earlier described. A ceramic sphere having the same physical and mechanical properties as in Example 1 was placed in contact with the disk. Under the same conditions of apparatus operation as described in Example 1, the unlubricated disk was rotated for a period of 17 minutes, and the test was then terminated. The average wear factor of the unlubricated sphere after 17 minutes was $4.4 \times 10^{-13}$ $m^3/(N-m)^{-1}$. Through this comparison test of lubricated vs. unlubricated substrates as defined in Example 1 and in this Example, the highly significant effectiveness of the lubrication and its application procedure as described in Example 1 is apparent. The procedure of Example 1 was operated for more than 335 times the time period of Example 2. The wear factor was below that of Example 2 by three orders of magnitude.

EXAMPLES 3 & 4

In the same manner as in Example 1, prepared ceramic disks comprising 85% aluminum oxide had deposited thereon the eutectic mixture of calcium fluoride and barium fluoride and then were respectively secured to the top of the shaft 14 of the motor 12, as earlier described. Under the same conditions of apparatus operation as described in Example 1, two separate wear tests were performed for respective time periods of 1.5 hours and 5.5 hours. Both the 1.5-hour test and the 5.5-hour test showed no detectable wear on the sphere upon microscopic examination, with the latter test representing a total sliding distance of nearly 7800 meters. The resolution of the microscope used for examination, at a magnification of 100X, was 1.3 $\mu$m. The upper limit of wear which could be measured was $1.8 \times 10^{-27}$ $m^3/(N-m)^{-1}$, meaning that at 5.5 hours of operation, any wear which may have occurred, but which could not be detected, was 10 orders of magnitude less than any other known technique of lubrication and 14 orders of magnitude less than an unlubricated state.

EXAMPLE 5

Figure 4:
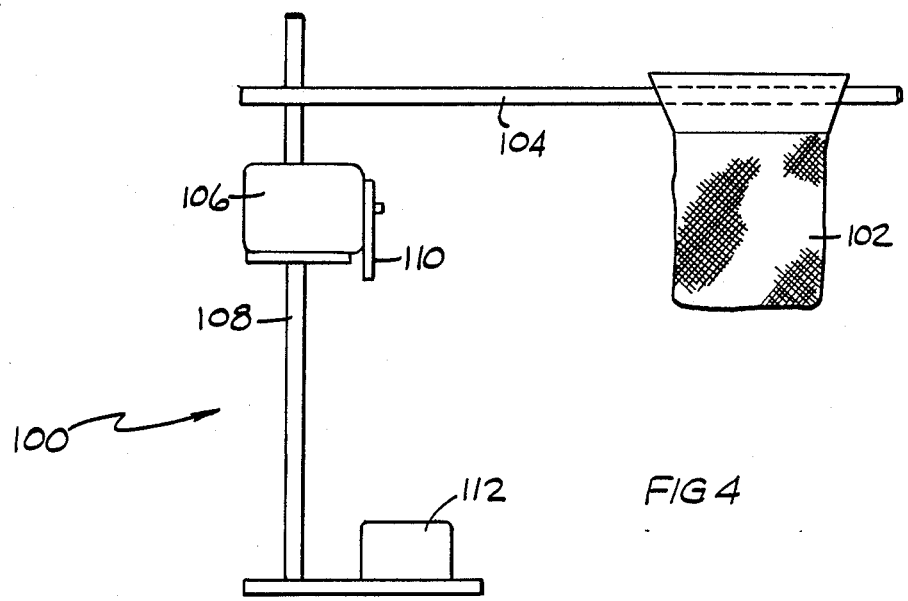
FIG. 4 is a schematic elevational view of an apparatus for deposition of fine solid lubricant particles on a substrate.

In the same manner as in Example 1, a prepared ceramic disk comprising 85% aluminum oxide had deposited thereon the eutectic mixture of calcium fluoride and barium fluoride and then was secured to the top of the shaft 14 of the motor 12. Since it had been determined, as outlined in Example 4, that a minimum of 5.5 hours could elapse before any wear was detectable, fine particles of calcium fluoride were deposited periodically directly onto the disk after 5.5 hours of operation as the disk continued to rotate against the sphere. The apparatus 100 shown in FIG. 4 was employed, and functions as a vibrator to release fine particles of calcium fluoride from a porous cloth sack 102 mounted on an arm 104. An electric motor 106 mounted on a vertical support rod 108 is provided with an eccentric load 110 and operated by a conventional speed controller means 112. In operation, the electric motor 106 causes vibration of the vertical support 108, which in turn vibrates the arm 104 and causes the cloth sack 102 to likewise vibrate. Such vibration results in the escape of fine particles of calcium fluoride from the cloth sack 102, which is positioned above the rotating disk to thereby provide deposition of particles on the disk. An alternative method for such particle deposition employs an Erlenmeyer flask containing a quantity of calcium fluoride particles and fitted with a two-hole stopper. A tube leading from a nitrogen gas source extends through one hole of the stopper to the floor of the flask, while a second tube leads from the stopper to a site above the rotating disk. Nitrogen under pressure is introduced into the bottom of the flask, and fine calcium fluoride particles are carried in nitrogen escaping from the second tube for delivery onto the rotating disk.

While operating under the same conditions as in Example 1, a series of periodic applications of fine calcium fluoride particles, with each application lasting about 30-40 seconds and performed about every 30 minutes after an initial run of 5.5 hours, resulted in a coefficient of friction value equivalent to that at 5.5 hours, therefore indicating that no detectable wear occurred. Rubbing of the disk and sphere against each other resulted in even distribution and bonding of the added calcium fluoride particles due to burnishing in the track surface of the disk. Lubricity was therefore maintained through periodic addition of the renewal lubricant particles, and no detectable measure of diminished lubricity maintenance occurred over a period of repeated applications.

EXAMPLE 6

A particle mixture comprising about 80% of a eutectic mixture of barium fluoride (68%) and calcium fluoride (32%) and about 20% silver was prepared. About 20 grams of the particle mixture was stirred into about 40 ml methyl alcohol, in which the particle mixture is insoluble, to thereby produce a colloidal suspension. After about 15 minutes, the time described in Example 1 and required to allow larger particles to the particle mixture to settle, a disk prepared and cleaned as described in Example 1 was placed in the colloidal suspension and a deposition of colloidal particles yet in suspension occurred on the disk as these particles gravitationally moved to the disk surface. After particle deposition, the disk remained in the vessel until the alcohol evaporated and the disk was dry. After such drying, a fine powder of the particle mixture remained on the disk. After 39 hours of testing operation under the same apparatus conditions as in Example 1, an average wear factor of only $6.873 \times 10^{-17}$ $m^3/(N-m)^{-1}$ resulted. Again, the rubbing of the sphere and disk against each other resulted in a burnished track surface on the disk wherein the particle mixture was evenly distributed and bonded.

The Examples presented above exemplify a significant breakthrough in deposition in bonding and in maintenance of a solid lubricant on a substrate. While deposition is here accomplished from a colloidal suspension in a liquid in which the solid lubricant particles are essentially insoluble, any technique can be employed which accomplishes the introduction of fine lubricant particles on a substrate. Thus, for example and not for limitation, a dry suspension of particles can be prepared in a gas and allowed to gravitationally settle on the surface of a substrate. In accord with the teachings of the present invention, any solid lubricant can be deposited on any substrate so long as the substrate has compatibly-sized surface depressions and/or pores of a size sufficient to accommodate the size of the lubricant particles.

Bonding the solid lubricant to the substrate is accomplished by simply burnishing the substrate after deposition thereon of the lubricant particles. As exemplified, burnishing can be achieved by the rubbing action of a second substrate against the lubricated substrate during operation of apparatus in which the two substrates normally reside in moving contact.

Finally, substrate lubricity can be maintained indefinitely by merely periodically depositing fine lubricant particles on the substrate and burnishing the substrate. This deposition can occur while the substrate is in operation in moving contact with another substrate, with burnishing accomplished by the moving-contact action. In addition to lubricity maintenance of a substrate which has been initially lubricated in accord with the present invention, such maintenance can also occur on substrates initially lubricated in some other manner. This lubricity maintenance is accomplished by simply periodically depositing fine lubricant particles on the substrate and burnishing as described above.

The inventive process here described can be employed in the lubrication of substrates in moving contact at room temperature through temperatures of 700° C. and above. Of particular significance are the high-temperature lubrication capability and the lubrication maintenance capability of the present process which permit employment of this process in the lubrication of machinery which operates at high temperatures. Thus, for example, vehicle or other engines constructed of ceramic components can be developed to operate at high, and very efficient, temperature ranges without conventional cooling systems because the present inventive process accomplishes initial and continued lubrication of moving-contact components at high-efficiency temperatures. Likewise, this efficiency can be realized in all apparatus having moving-contact parts and requiring efficient and maintainable lubrication.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A process for applying and bonding a solid lubricant on a substrate whose surface has depressions and pores, said process comprising the sequential steps of:
   (a) suspending fine solid lubricant particles in a fluid medium in which the lubricant particles are insoluble and in excess of a quantity sufficient to fill the depressions and pores on the surface of the substrate to thereby provide a lubricant particle suspension;
   (b) positioning the substrate in the lubricant particle suspension to permit the lubricant particles to become deposited by gravitation on the surface of the substrate; and
   (c) burnishing the surface of the substrate having the lubricant particles deposited thereon to thereby distribute and bond the lubricant particles on the substrate.

2. The process as claimed in claim 1 wherein the solid lubricant particles comprise a eutectic mixture of calcium fluoride and barium fluoride.

3. The process as claimed in claim 2 and wherein silver is admixed with the eutectic mixture.

4. The process as claimed in claim 1 wherein the fluid medium comprises an alcohol.

5. The process as claimed in claim 4 wherein the fluid medium is methyl alcohol.

6. The process as claimed in claim 1 wherein the substrate is a ceramic material.

7. A process for applying, bonding, and maintaining a solid lubricant on a substrate whose surface has depressions and pores, said process comprising the sequential steps of:
   (a) suspending fine solid lubricant particles in a fluid medium in which the lubricant particles are insoluble and in excess of quantity sufficient to fill the depressions and pores on the surface of the substrate to thereby provide a lubricant particle suspension;
   (b) positioning the substrate in the lubricant particle suspension to permit the lubricant particles to become deposited by gravitation on the surface of the substrate;
   (c) burnishing the surface of the substrate having the lubricant particles deposited thereon to thereby distribute and bond the lubricant particles on the surface of the substrate;
   (d) periodically gravitationally depositing additional fine solid lubricant particles on the surface of the substrate after a portion of the initial lubricant particles is worn away because of wear by positioning said worn substrate in said lubricant particle suspension thereon; and
   (e) burnishing the surface of the substrate having the additional lubricant particles deposited thereon to thereby distribute and bond the additional lubricant particles on the substrate.

8. The process as claimed in claim 7 wherein the initial lubricant particles comprise a eutectic mixture of calcium fluoride and barium fluoride.

9. The process as claimed in claim 8 and wherein silver is admixed with the eutectic mixture.

10. The process as claimed in claim 7 wherein the additional lubricant particles comprise calcium fluoride.

11. The process as claimed in claim 7 wherein the substrate comprises a ceramic material.

* * * * *